(12) United States Patent
Gorthi et al.

(10) Patent No.: US 9,570,079 B1
(45) Date of Patent: *Feb. 14, 2017

(54) GENERATING CALL CONTEXT METADATA FROM SPEECH, CONTACTS, AND COMMON NAMES IN A GEOGRAPHIC AREA

(71) Applicant: International Business Machines Corporation, Armonk, NY (US)

(72) Inventors: Ramakrishna J. Gorthi, Pune (IN); Chandrajit G. Joshi, Pune (IN); Romil J. Shah, Pune (IN)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/201,937

(22) Filed: Jul. 5, 2016

Related U.S. Application Data

(63) Continuation of application No. 15/017,903, filed on Feb. 8, 2016, now Pat. No. 9,462,102, which is a
(Continued)

(51) Int. Cl.
*G10L 17/22* (2013.01)
*H04M 3/42* (2006.01)
(Continued)

(52) U.S. Cl.
CPC ............ *G10L 17/22* (2013.01); *G10L 25/51* (2013.01); *H04M 1/274508* (2013.01);
(Continued)

(58) Field of Classification Search
CPC .............. G10L 17/005; H04M 1/271; H04M 1/274508; H04M 3/42357; H04W 4/02
(Continued)

(56) References Cited

U.S. PATENT DOCUMENTS

| | | | |
|---|---|---|---|
| 6,249,765 B1 * | 6/2001 | Adler | G10L 15/04 379/88.03 |
| 6,553,236 B1 | 4/2003 | Dunko et al. | |

(Continued)

FOREIGN PATENT DOCUMENTS

| | | |
|---|---|---|
| EP | 2302573 A1 | 3/2011 |
| WO | 2008122836 A1 | 10/2008 |

(Continued)

OTHER PUBLICATIONS

Gorthi et al., Call Context Metadata, U.S. Appl. No. 14/948,416, filed Nov. 23, 2015.
(Continued)

*Primary Examiner* — Martin Lerner
(74) *Attorney, Agent, or Firm* — Kristofer L. Haggerty

(57) ABSTRACT

A computer detects a connected voice or video call between participants and records a brief media sample. Speech recognition is utilized to determine when the call is connected as well as to transcribe the content of the audio portion of the media sample. The recorded media sample and transcribed content is associated with the connected voice or video call such that a user may reference it at a later point. The computer additionally suggests creating or editing contact information associated with the participants of the connected voice or video call based on the transcribed content.

1 Claim, 3 Drawing Sheets

Related U.S. Application Data continuation of application No. 14/948,416, filed on Nov. 23, 2015.

(51) Int. Cl.
*H04M 1/2745* (2006.01)
*G10L 25/51* (2013.01)

(52) U.S. Cl.
CPC ... *H04M 3/42025* (2013.01); *H04M 3/42221* (2013.01); *H04M 3/42357* (2013.01); *H04M 2201/40* (2013.01); *H04M 2201/41* (2013.01)

(58) Field of Classification Search
USPC ........ 704/246, 250; 379/88.01, 88.03, 88.11, 379/142.06, 88.02; 455/414.2, 456.3
See application file for complete search history.

(56) References Cited

U.S. PATENT DOCUMENTS

| | | | |
|---|---|---|---|
| 6,651,218 B1 | 11/2003 | Adler et al. | |
| 7,889,847 B2 | 2/2011 | Gainsboro | |
| 8,103,873 B2 | 1/2012 | Claudatos et al. | |
| 8,462,919 B2 | 6/2013 | Piratla et al. | |
| 8,694,313 B2* | 4/2014 | Lloyd | H04M 1/271 704/231 |
| 8,929,517 B1 | 1/2015 | Lavian et al. | |
| 9,088,647 B2 | 7/2015 | Mathur et al. | |
| 9,462,102 B1* | 10/2016 | Gorthi | G10L 17/005 |
| 2003/0032410 A1* | 2/2003 | Saraswat | H04M 1/274516 455/414.1 |
| 2003/0158864 A1 | 8/2003 | Samn | |
| 2006/0035632 A1* | 2/2006 | Sorvari | H04M 1/271 455/418 |
| 2006/0259474 A1 | 11/2006 | Granito | |
| 2007/0238451 A1 | 10/2007 | Borzsei | |
| 2008/0112553 A1 | 5/2008 | Chen et al. | |
| 2008/0222127 A1 | 9/2008 | Bergin | |
| 2008/0250066 A1* | 10/2008 | Ekstrand | H04M 1/274516 |
| 2009/0156179 A1 | 6/2009 | Hahn et al. | |
| 2009/0262914 A1 | 10/2009 | Khouri et al. | |
| 2010/0246784 A1* | 9/2010 | Frazier | H04M 3/2281 379/88.13 |
| 2010/0248744 A1* | 9/2010 | Bychkov | H04W 4/02 455/456.2 |
| 2010/0299131 A1 | 11/2010 | Lanham et al. | |
| 2011/0151850 A1 | 6/2011 | Haaparanta et al. | |
| 2011/0201320 A1* | 8/2011 | Wosk | H04W 4/12 455/415 |
| 2011/0270609 A1* | 11/2011 | Jones | G10L 15/26 704/235 |
| 2012/0008838 A1 | 1/2012 | Guyon et al. | |
| 2012/0036132 A1 | 2/2012 | Doyle | |
| 2012/0249328 A1 | 10/2012 | Xiong | |
| 2012/0304260 A1 | 11/2012 | Steeves et al. | |
| 2012/0310922 A1 | 12/2012 | Johnson et al. | |
| 2013/0028398 A1 | 1/2013 | Mikan et al. | |
| 2013/0129060 A1* | 5/2013 | Gopalakrishnan | H04L 67/18 379/93.01 |
| 2013/0157694 A1* | 6/2013 | Granito | H04W 4/02 455/456.3 |
| 2013/0177143 A1 | 7/2013 | Zhou et al. | |
| 2013/0244623 A1 | 9/2013 | Cudak et al. | |
| 2013/0262996 A1 | 10/2013 | Jang et al. | |
| 2014/0057608 A1 | 2/2014 | Hillier et al. | |
| 2014/0067362 A1 | 3/2014 | Hershenhorn | |
| 2014/0143157 A1 | 5/2014 | Jeffs et al. | |
| 2014/0179290 A1* | 6/2014 | Jung | H04W 4/12 455/415 |
| 2014/0201246 A1 | 7/2014 | Klein et al. | |
| 2014/0294302 A1 | 10/2014 | King et al. | |
| 2014/0314225 A1 | 10/2014 | Riahi et al. | |
| 2015/0006568 A1* | 1/2015 | Brunn | G10L 15/08 707/769 |
| 2015/0356973 A1* | 12/2015 | Wansley | G10L 17/005 704/246 |
| 2016/0019896 A1* | 1/2016 | Alvarez Guevara | G10L 15/08 704/249 |

FOREIGN PATENT DOCUMENTS

| | | |
|---|---|---|
| WO | 2009146087 A1 | 12/2009 |
| WO | 2014201670 A1 | 12/2014 |

OTHER PUBLICATIONS

Gorthi et al., Call Context Metadata, U.S. Appl. No. 15/017,903, filed Feb. 8, 2016.

IBM: List of IBM Patents or Patent Applications Treated As Related (Appendix P), Sep. 8, 2016, pp. 1-2.

* cited by examiner

US 9,570,079 B1

GENERATING CALL CONTEXT METADATA FROM SPEECH, CONTACTS, AND COMMON NAMES IN A GEOGRAPHIC AREA

TECHNICAL FIELD

The present invention relates generally to telephone and video communications, and more particularly to creating and storing contextual metadata detailing a telephone or video communication.

BACKGROUND

Caller identification makes saving and identifying contacts extremely convenient. However, it is not always worthwhile for a user to add every person with whom the user communicates to the contact list of the user. In fact, not only is it common for a user to forget adding the unknown caller to their contacts list, many times a user disregards the unknown caller only to find that they need to contact the caller several days or weeks later. In such cases, the user must search through their call history and may even try several incorrect numbers until they determine the correct number and reach the intended recipient.

SUMMARY

Embodiments of the present invention disclose a method, system, and computer program product for generating call context metadata. A computer detects a connected voice or video call between participants and records a brief media sample. Speech recognition is utilized to determine when the call is connected as well as to transcribe the content of the audio portion of the media sample. The recorded media sample and transcribed content is associated with the connected voice or video call such that a user may reference it at a later point. The computer additionally suggests creating or editing contact information associated with the participants of the connected voice or video call based on the transcribed content.

DETAILED DESCRIPTION

Embodiments of the present invention will now be described in detail with reference to the accompanying figures.

Figure 1:
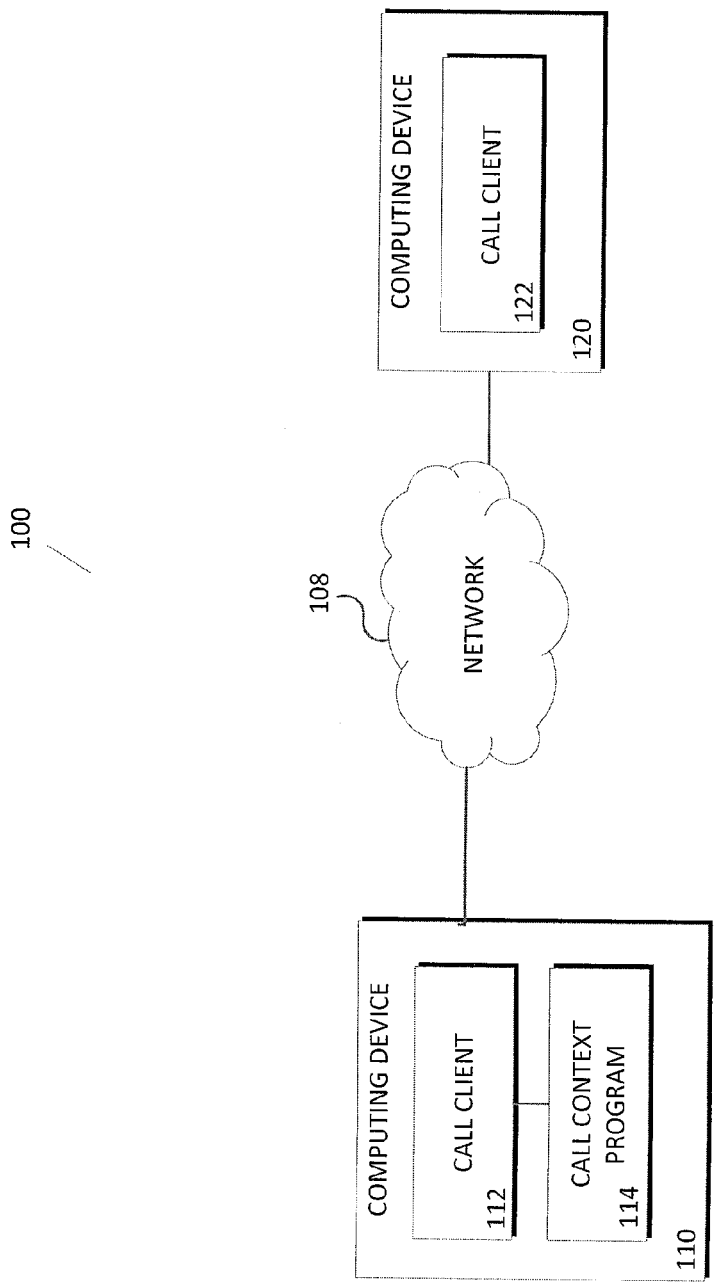
FIG. 1 illustrates a call context metadata system 100, in accordance with an embodiment of the invention.

FIG. 1 illustrates a call context metadata system 100, in accordance with an embodiment of the invention. In the example embodiment, call context metadata system 100 includes computing device 110, call client 112, call context program 114, network 108, computing device 120, and call client 122.

In the example embodiment, network 108 is a telecommunications network used for telephone calls between two or more parties. In the example embodiment, network 108 may be a landline network, a wireless network, a closed network, or any combination thereof. In other embodiments, however, network 108 may be the Internet, representing a worldwide collection of networks and gateways to support communications between devices connected to the Internet. Network 108 may include, for example, wired, wireless or fiber optic connections. In other embodiments, network 108 may be implemented as an intranet, a local area network (LAN), or a wide area network (WAN). In general, network 108 can be any combination of connections and protocols that will support communications between computing device 110 and computing device 120.

Computing device 120 includes call client 122. Computing device 120 may be a laptop computer, a notebook, tablet computer, netbook computer, personal computer (PC), a desktop computer, a personal digital assistant (PDA), a smart phone, a thin client, or any other electronic device or computing system capable of receiving and sending data to and from other computing devices. While computing device 120 is shown as a single device, in other embodiments, computing device 120 may be comprised of a cluster or plurality of computing devices, working together or working separately. Computing device 120 is described in further detail with reference to FIG. 3.

Call client 122 is an application on computing device 120 which is capable of transmitting audio, video, and information communications over a network, such as network 108, to another computing device, such as computing device 110. Call client 122 may be connected to a modem, land line, mobile phone, satellite phone, or any combination thereof while the transmissions may be bi-directional (two-way) as well as multicast (conference call). In the example embodiment, call client 112 hosts telephone calls, however, in other embodiments, call client 122 may host video calls or any other forms of audio, video, or information communications.

Computing device 110 includes call client 112 and call context program 114. In the example embodiment, computing device 110 may be a laptop computer, a notebook, tablet computer, netbook computer, personal computer (PC), a desktop computer, a personal digital assistant (PDA), a smart phone, a thin client, or any other electronic device or computing system capable of receiving and sending data to and from other computing devices. While computing device 110 is shown as a single device, in other embodiments, computing device 110 may be comprised of a cluster or plurality of computing devices, working together or working separately. Computing device 110 is described in more detail with reference to FIG. 3.

Call client 112 is an application on computing device 110 which, in the example embodiment, is integrated with call context program 114. In other embodiments, call client 112 and call context program 114 may be partially integrated or standalone programs. Call client 112 is capable of transmitting audio, video, and information communications over a network, such as network 108, between devices, such as computing device 110 and computing device 120. Call client 112 may be connected to a modem, land line, mobile phone, satellite phone, or any combination thereof while the transmissions may be bi-directional (two-way) as well as multicast (conference call). In the example embodiment, call client 112 hosts telephone calls, however, in other embodiments, call client 112 may host video calls or any other forms of audio, visual, or information communications.

In the example embodiment, call context program 114 is a program integrated with call client 112 which is capable of detecting a connected call and obtaining a brief sample of that communication. Call context program 114 is further capable of utilizing voice recognition technology to transcribe and save the sample content in a location associated with the call. Call context program 114 is additionally capable of analyzing the transcribed sample content and suggesting inputs for contact information fields corresponding to a new or existing contact based on the analyzed content.

Figure 2:
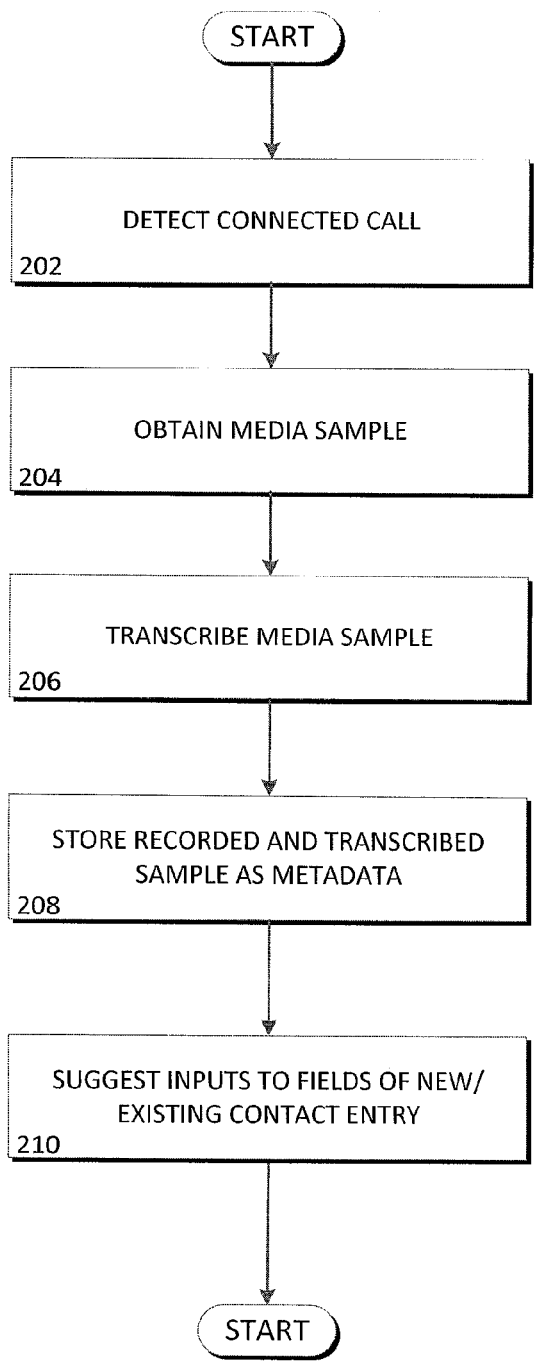
FIG. 2 is a flowchart illustrating the operations of call context program 114 of FIG. 1 in saving and storing contextual metadata corresponding to a communication.

FIG. 2 is a flowchart depicting the operations of call context program 114 in recording, transcribing, and storing a brief sample of media corresponding to a voice or video call. In the example embodiment where call context program 114 is integrated with call client 112, call context program 114 detects a connected call by monitoring call client 112 (step 202). In the example embodiment, a call is considered connected when call context program 114 recognizes identifiable words spoken by one of the participants of a call between call client 112 and call client 122. Call context program 114 determines whether a sound is an identifiable word by utilizing speech recognition technology such as a Hidden Markov Model (HMM). In the example embodiment, a Hidden Markov Model (HMM) is statistical model that outputs a sequence of symbols or quantities. HMMs are used in speech recognition because a speech signal can be viewed as a piecewise stationary signal and in these short lengths of time, speech can be approximated as a stationary process. Hidden Markov Models output a sequence of n-dimensional real-valued vectors approximately every ten milliseconds and each vector represents a phoneme (basic unit of a language's phonology that is combined with other phonemes to form words). The vectors consist of the most significant coefficients, known as cepstral coefficients, decorrelated from a spectrum that is obtained by applying a cosine transform to the Fourier transform of the short window of speech analyzed. The resulting statistical distribution is a mixture of diagonal covariance Gaussians which give a likelihood for each observed vector, or likelihood for each phoneme. The output distribution, or likelihood, of each phoneme is then used to concatenate the individual HMMs into words and sentences. Using an HMM, call context program 114 is capable of determining when recognizable speech is detected and when a call is considered connected. Once call context program 114 determines that a call is connected, call context program 114 begins recording the call. In other embodiments, however, call context program 114 may recognize speech utilizing methods such as phonetic transcription, orthographic transcription, dynamic time warping, neural networks, or deep neural networks. For example, if Alpha dials Beta and Beta answers by stating "hello", then call context program 114 recognizes the word "hello" by utilizing an HMM and considers the call connected. Similarly, continuing the example, if Beta does not answer and Alpha reaches the voicemail of Beta stating "hi, you have reached Beta . . . ", then call context program 114 recognizes the word "hi" and considers the call connected. Similarly, if Alpha dials a company with an automated answering service which states "thank you for calling company Charlie . . . ", then call context program 114 recognizes the word "thank" and considers the call connected. Conversely, if Alpha calls Beta and neither Beta nor the answering machine of Beta responds, then call context program 114 does not consider the call connected.

Call context program 114 obtains a media sample of the voice or video call (step 204). In the example embodiment, call context program 114 records an audio sample of the call between call client 112 and call client 122, however in other embodiments utilizing video calls, call context program 114 may record both an audio and video sample of the video call. In the example embodiment, call context program 114 begins recording a media sample of the call when the call is considered connected (when speech is recognized) to avoid recording dial tones and ringing yet still record answering machines and automated answering services. In other embodiments, call context program 114 can be configured to start recording when the call is dialed, after a user-set period of time after the call has been dialed, or upon other triggers configured by the user through a user interface. In the example embodiment, call context program 114 records a sample of ten seconds, however in other embodiments, the call sample may be user set to any duration. Continuing the example above, when Beta answers the phone call by stating "hello", call context program 114 considers the call connected and begins recording the ten-second media sample. Conversely, if Beta nor the answering machine of Beta never answer and the ring tone continues, call context program 114 does not consider the phone call connected and, thus, does not record the media sample.

Call context program 114 utilizes speech recognition to transcribe the audio segment of the call sample (step 206). In the example embodiment, call context program 114 utilizes a Hidden Markov Model to transcribe the audio content of the call in much the same way call context program 114 utilizes a HMM to recognize identifiable words when detecting a connected call in step 202. In other embodiments, call context program 114 may utilize other speech recognition techniques such as phonetic transcription, orthographic transcription, dynamic time warping, neural networks, and deep neural networks. In the example embodiment, call context program 114 transcribes the duration of the audio segment contained in the media sample. In the example embodiment, call context program 114 does not distinguish between the words spoken by each participant of the phone call and transcribes the conversation in chronological order, however in other embodiments, call context program 114 may utilize voiceprints (such as a comparison of detected speech to a voiceprint database) or other voice distinguishing factors to distinguish the words spoken between participants of the call. Continuing the example above where Alpha dials Beta, if Beta answers "hello" and Alpha states "hi, this is Alpha with company Charlie", then call context program 114 recognizes the speech of the media sample and transcribes the statements "hello" and "hi, this is Alpha with company Charlie."

Call context program 114 stores the recorded and transcribed content of the media sample as call metadata (step 208). In the example embodiment, call context program 114 stores the media sample and transcribed audio sample as metadata associated with the call in the call history of the user. Furthermore, in the example embodiment, the metadata is stored on computing device 110, however in other embodiments, the metadata may be stored remotely via network 108, such as on a cloud server. The stored metadata containing the transcript and recording are deleted after one month in the example embodiment, however in other embodiments, the stored metadata containing the transcript and recording may be deleted after a user-set period of time configured in a user interface of call client 112. Furthermore, a user may configure call context program 114 to delete the metadata upon user entry into the fields corresponding to the contact associated with the call. For example, call context program 114 may be configured to delete any metadata associated with a contact number once the name field of the contact associated with that number is saved by the user. In the example embodiment, a user accesses said metadata by selecting the call from the native user interface of call client 112 listing the call history of the user and selecting a menu which provides an option to view the metadata associated with the selected call. Within the user interface, the user is provided options for actions associated with the metadata such as view the transcript as well as play, pause, rewind, and fast forward the audio and/or video media sample. Continuing the example above where Alpha dials Beta, if Beta wants to listen to or read the transcription of the call, Beta selects the call from the call history of Beta and selects an option to view and/or listen to the metadata associated with the call.

Call context program 114 suggests inputs to the fields of new and/or existing contacts (step 210). In the example embodiment, call context program 114 first compares words within the transcript transcribed in step 206 with the names of existing contacts of the user to determine whether the caller is an existing contact. Situations where an unknown number may correspond to an existing contact may include, for example, when a user knows the cell phone number of a contact but does not know the work phone number or home phone number of said contact. If call context program 114 determines that the name of an existing contact matches a word within the transcript, call context program 114 determines whether there are any blank fields within the corresponding contact information, such as other numbers, an address, or work designation. If more than one contact name is matched by words within the transcript, the user is prompted to select which contact corresponds to the number prior to determining whether any blank fields are within the corresponding contact information. For example, if a caller states "hi, this is Delta, Epsilon introduced us . . . " and both Delta and Epsilon are within the contact list of the user, then the user is prompted to select whether the number corresponds to Delta or Epsilon before determining whether either contact is associated with any blank fields. If the contact information contains blank fields, such as the address or work phone number fields, call context program 114 determines whether the transcript can provide information for the blank fields. In order to determine whether the blank fields can be filled by words within the transcript, call context program 114 associates lists of common field attributes with each field of a contact. Such field attributes may include a digital map associated with the contact address field or an electronic business directory associated with the contact company field. If any words within the transcript match a word within the list of common field attributes associated with an empty field, call context program 114 suggests inputting the match into the empty contact field. If multiple matches correspond to a single empty contact field, then call context program 114 provides options to select any of the matches, input a custom field entry, or take no action. In some embodiments, the attributes within lists of common field attributes may be weighed such that more common or likely attributes are suggested at the top of the list. Continuing the example above with the transcript "Hello. Hi, this is Alpha with company Charlie" and company Charlie is present on a list of common company attributes, if the contact Alpha exists in the contacts list of Beta but the corresponding company field entry is blank, then call context program 114 identifies Alpha as an existing contact and identifies/suggests company Charlie as the input of the company field of contact Alpha.

If none of the names of existing contacts match words within the transcript, call context program 114 similarly references a list of common name attributes (common name list) to determine whether any names within the transcript match any names within the list of common name attributes. In the example embodiment, the list of common name attributes is associated with a geographic area to reflect which names are common in a particular region. For example, common names in the United States may vary significantly from common names in India. In the example embodiment, call context program 114 first references call client 112 to obtain the phone number of an incoming or outgoing call. Then, based on the area code included in the phone number, call context program 114 determines the geographic area of the caller and references a directory of names corresponding to the geographic area, such as a phonebook or database of property owners. In other embodiments, or when the number of the incoming or outgoing call cannot be determined, call context program 114 may similarly utilize the area code of the phone number corresponding to the user, rather than an incoming or outgoing call, to determine the common names of a geographic area.

In further embodiments, call context program 114 may determine the location of the user by utilizing Global Positioning System (GPS) information provided by a GPS module included on computing device 110. In the example embodiment, computing device 110 includes a GPS module (hardware or hardware/software combination) which receives and processes temporal and locational information from four or more space-based satellites. Each satellite broadcasts a continuous signal detailing satellite identification information, time of transmission (TOT), and the precise location of the satellite at that time. When the GPS module picks up the signals of four or more GPS satellites, the GPS module determines the difference in time between the times of transmission and the times of arrival (TOA) at the GPS module. Based on the amount of time it took to receive the signals and the precise locations of the satellites when the signals were sent, the GPS module is capable of determining the location where the signals were received. In such embodiments utilizing a GPS module to determine the location of the user, the user may define the geographic area around the location of the user by inputting a threshold distance measured from the location of the user. For example, a user may input a distance of 6 miles, thus forming a circle around the location of the user 6 miles in radius. Alternatively, the user may also input distances in each direction, such as 10 kilometers (km) north, 8 km east, and 3 km in the south and west directions, forming a square. Based on the location of the user and the geographic area defined by the user, call context program 114 similarly references a directory to determine the common names associated with that geographic area.

If call context program 114 determines that a name within the transcript matches a name on the list of common name attributes, then call context program 114 suggests creating a new contact with said name and determines whether the transcript can provide information for any blank fields associated with the new contact in a manner similar to above. If multiple names within the transcript match multiple names on the list of common name attributes, call context program 114 provides options for the user to select one of the matching names, input a custom field entry, or take no action. Continuing the example above between Alpha and Beta where the transcript consists of "Hello. Hi, this is Alpha with company Charlie", if the name Alpha and Charlie are both present on a list of common name attributes and there is no Alpha nor Charlie in the contacts list of user Beta, then call context program 114 identifies Alpha and Charlie as potential contact names and provides Beta with the options to create a new contact with the name Alpha, create a new contact with the name Charlie, input a custom field entry, and take no action. Similarly, if the word "Charlie" is on both a list of common name attributes as well as a list of common company attributes, then call context program 114 suggests the word "Charlie" for both fields if both fields are blank.

Figure 3:
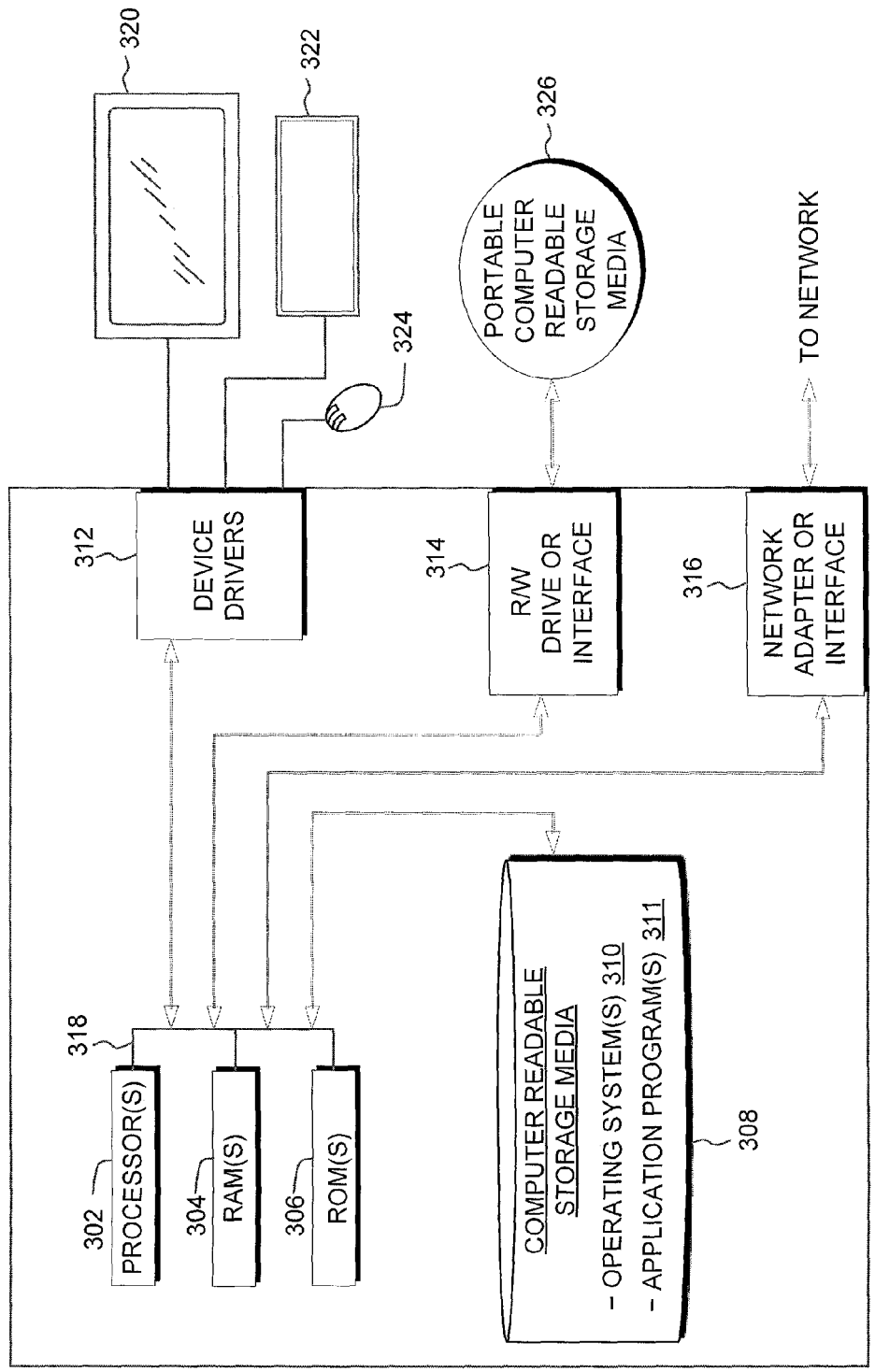
FIG. 3 is a block diagram depicting the hardware components of a call context metadata system 100 of FIG. 1, in accordance with an embodiment of the invention.

FIG. 3 depicts a block diagram of components of computing device 110 of a call context metadata system 100 of FIG. 1, in accordance with an embodiment of the present invention. It should be appreciated that FIG. 3 provides only an illustration of one implementation and does not imply any limitations with regard to the environments in which different embodiments may be implemented. Many modifications to the depicted environment may be made.

Computing device 110 may include one or more processors 302, one or more computer-readable RAMs 304, one or more computer-readable ROMs 306, one or more computer readable storage media 308, device drivers 312, read/write drive or interface 314, network adapter or interface 316, all interconnected over a communications fabric 318. Communications fabric 318 may be implemented with any architecture designed for passing data and/or control information between processors (such as microprocessors, communications and network processors, etc.), system memory, peripheral devices, and any other hardware components within a system.

One or more operating systems 310, and one or more application programs 311, for example, call context program 114, are stored on one or more of the computer readable storage media 308 for execution by one or more of the processors 302 via one or more of the respective RAMs 304 (which typically include cache memory). In the illustrated embodiment, each of the computer readable storage media 308 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Computing device 110 may also include a R/W drive or interface 314 to read from and write to one or more portable computer readable storage media 326. Application programs 311 on computing device 110 may be stored on one or more of the portable computer readable storage media 326, read via the respective R/W drive or interface 314 and loaded into the respective computer readable storage media 308.

Computing device 110 may also include a network adapter or interface 316, such as a TCP/IP adapter card or wireless communication adapter (such as a 4G wireless communication adapter using OFDMA technology). Application programs 311 on computing device 110 may be downloaded to the computing device from an external computer or external storage device via a network (for example, the Internet, a local area network or other wide area network or wireless network) and network adapter or interface 316. From the network adapter or interface 316, the programs may be loaded onto computer readable storage media 308. The network may comprise copper wires, optical fibers, wireless transmission, routers, firewalls, switches, gateway computers and/or edge servers.

Computing device 110 may also include a display screen 320, a keyboard or keypad 322, and a computer mouse or touchpad 324. Device drivers 312 interface to display screen 320 for imaging, to keyboard or keypad 322, to computer mouse or touchpad 324, and/or to display screen 320 for pressure sensing of alphanumeric character entry and user selections. The device drivers 312, R/W drive or interface 314 and network adapter or interface 316 may comprise hardware and software (stored on computer readable storage media 308 and/or ROM 306).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Based on the foregoing, a computer system, method, and computer program product have been disclosed. However, numerous modifications and substitutions can be made without deviating from the scope of the present invention. Therefore, the present invention has been disclosed by way of example and not limitation.

Various embodiments of the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer program product for generating call context metadata, the computer program product comprising:
   one or more computer-readable storage media and program instructions stored on the one or more computer-readable storage media, the program instructions comprising:
   program instructions to detect that a call is connected, wherein the call is connected based on speech being detected;
   program instructions to record a media sample corresponding to the connected call, wherein the media sample includes an audio recording of at least a portion of the detected speech;
   program instructions to identify one or more words contained within the at least a portion of the detected speech, wherein identifying the one or more words further comprises:
      program instructions to identify a first portion of the one or more words by comparing a voiceprint associated with the first portion with a voiceprint database and program instructions to identify a second portion of the one or more words by comparing a voiceprint associated with the second portion with the voiceprint database, and wherein the first portion of the one or more words corresponds to a first speaker and the second portion of the one or more words corresponds to a second speaker;
   program instructions to determine whether a phone number associated with the connected call is associated with one or more contacts detailed by a contact list of a user;
   based on determining that the phone number associated with the connected call is not associated with the one or more contacts detailed by the contact list of the user, program instructions to store the recorded media sample and the identified one or more words in association with the connected call;
   program instructions to determine a location of the user based on analyzing Global Positioning System (GPS) information associated with a device of the user;
   program instructions to reference a common name list, wherein the common name list details a set of commonly used names associated with a geographic area, and wherein the geographic area is an area within a distance of the location of the user;
   program instructions to determine whether at least one of the identified one or more words matches at least one of one or more names detailed by the common name list;
   based on determining that at least one of the identified one or more words matches at least one of the one or more names detailed by the common name list, program instructions to present an option to the user to add the at least one of the identified one or more words to the contact list of the user in association with the phone number associated with the connected call;

based on the user selecting the option to add the at least one of the identified one or more words to the contact list of the user in association with the phone number associated with the connected call, program instructions to add the at least one of the identified one or more words to the contact list of the user in association with the phone number associated with the connected call; and program instructions to delete the recorded media sample and the identified one or more words stored in association with the connected call, wherein one or more steps of the above method are performed using one or more computers.

\* \* \* \* \*